United States Patent Office 2,779,605
Patented Jan. 29, 1957

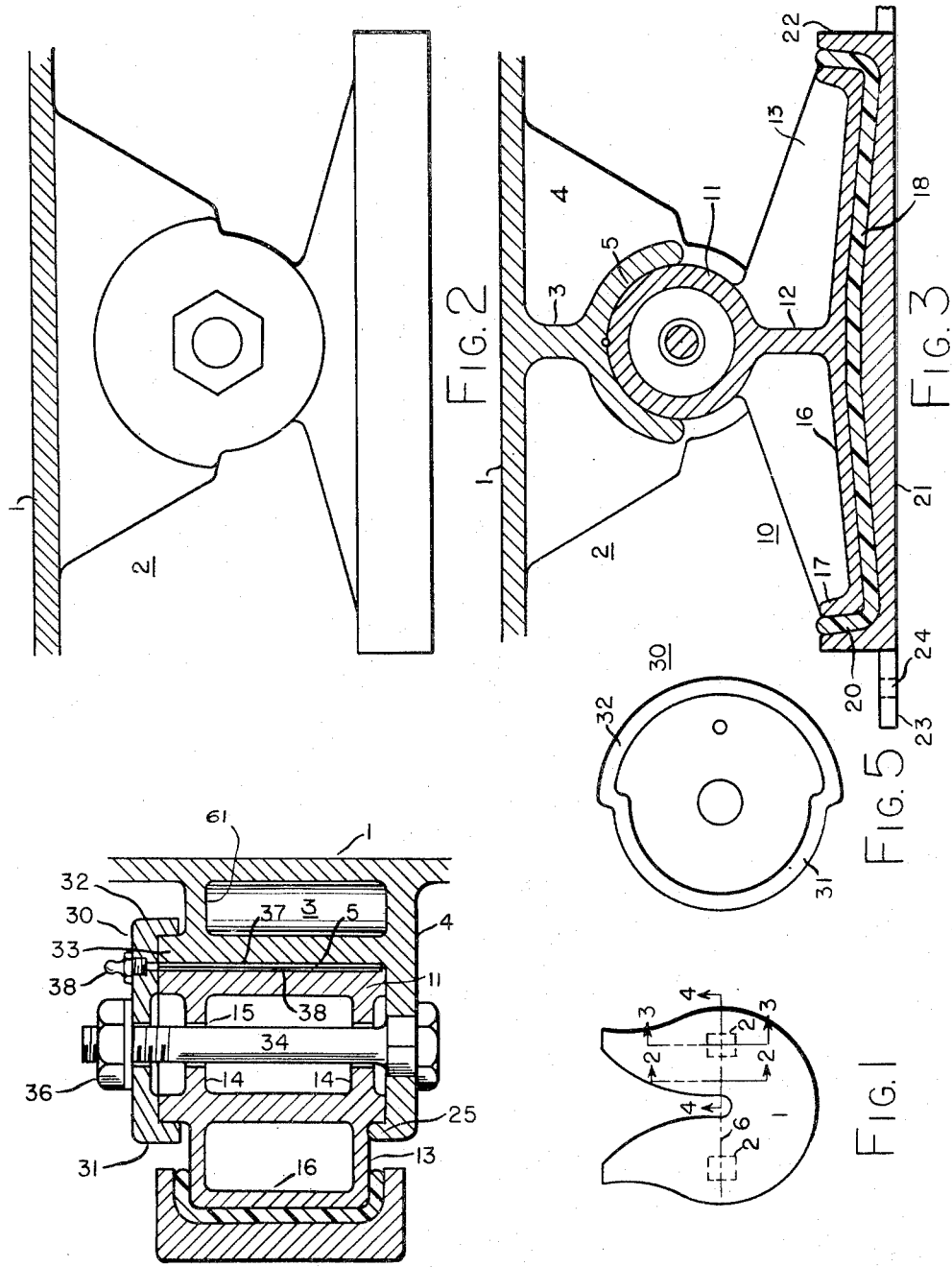

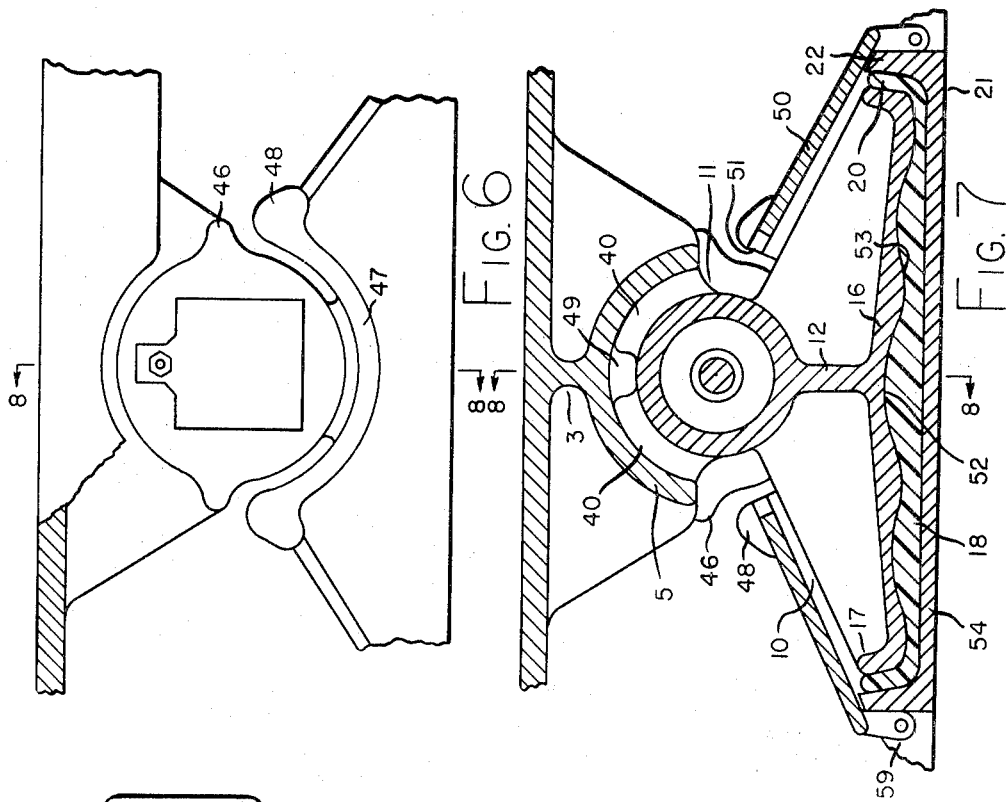
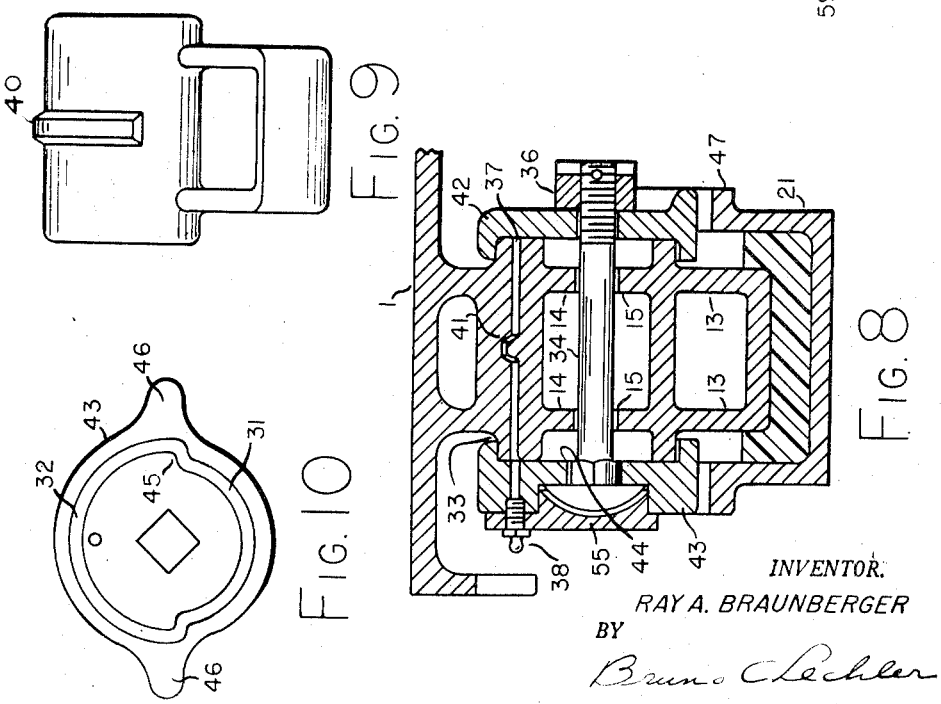

2,779,605

FIFTH WHEEL PLATE MOUNTING DEVICE

Ray A. Braunberger, Chicago, Ill.

Application February 19, 1954, Serial No. 411,361

17 Claims. (Cl. 280—440)

The invention relates to novel means of mounting the plate of a fifth wheel of the type used in connecting semi-trailers to tractors.

Such fifth wheels have a top plate upon which the forward end of the trailer rests. As the tractor draws the trailer along the road, the alignment of trailer and tractor is constantly changing, requiring that the fifth wheel plate be free to tilt relative to the shackles which support the fifth wheel plate. The invention relates to an improved support of the fifth wheel plate on the shackle.

Not only must the shackle support the fifth wheel plate and transmit constant jolts, but it must also transmit the horizontal tractive force which is also subject to jolts. The loads are heavy and the constantly repeated jolts are severe, causing much wear. The usual method of mounting the fifth wheel on the shackle includes a bolt that passes through the shackle and the lug of the fifth wheel plate and transmits these stresses in shear from the one to the other. The invention prevents the wear hitherto experienced, by eliminating, the load transmitting bolt and providing a large convex surface on either the fifth wheel plate or the shackle and a concave mating surface on the other.

Provision must also be made to prevent the fifth wheel rising and separating from the shackle. The invention provides for transmitting forces that tend to separate fifth wheel plate and shackle as well as the direct load through bearing surfaces rather than through a bolt in shear.

The object of the invention is to transmit all the forces between the fifth wheel plate and the shackle without the interposing of a shear element.

Another object of the invention is to provide direct bearing of the fifth wheel plate on the shackle with the freedom to move relative to each other.

Another object of the invention is to provide a shackle having a convex surface extending through an arc substantially 180 degrees upon which a similar concave surface forming a part of the fifth wheel plate rests with additional bearing surfaces becoming effective if the stresses are reversed.

Another object is to provide universal support for a fifth wheel in which the fifth wheel is supported on two shackles in such a way that the plate may rock on the shackles in a front-to-back direction, the shackles supported on rubber to permit each shackle to tilt, twist, and rock independent of the other to absorb movements other than tilting.

Figure 1 shows a fifth wheel in plan view.

Figure 2 shows to an enlarged scale, in elevation, one of the supports for the fifth wheel plate taken along lines 2—2 in Figure 1.

Figure 3 shows the same support for the fifth wheel plate in vertical section along lines 3—3 in Figure 1.

Figure 4 shows the same support in a vertical section taken along a plane at right angles to that of Figures 2 and 3 along lines 4—4 in Figure 1.

Figure 5 shows a side view of the clamp disc.

Figure 6 shows, in elevation, a modified form of one of the supports for the fifth wheel plate taken along lines 2—2 in Figure 1.

Figure 7 shows the same modified support for the fifth wheel plate in vertical section along lines 3—3 in Figure 1.

Figure 8 shows the same modified support in vertical section taken along a plane at right angles to that of Figures 6 and 7 along lines 8—8 in Figures 6 and 7.

Figure 9 is an end view of the modified form of the shackle member.

Figure 10 shows a side view of the modified clamp disc.

In that form of the invention shown in these drawings, 1 represents the fifth wheel plate which is supported on two lugs generally indicated at 2. Each lug comprises a vertical rib 3 and has a downwardly extending long rib 4 and short rib 61. On its lower side the lug has a concave cylindrical surface 5. The concave surfaces on the two lugs have a common axis 6 about which the fifth wheel may tilt.

Each lug rests on a shackle 10 having a head 11 which comprises a hollow cylinder supported on rib 12 and side walls 13. The hollow cylinder of each shackle has diaphragms 14. There is a central hole 15 in each diaphragm. The outside surface of the cylinder conforms to the concave surface 5 of the lug. The two side walls 13 and the rib 12 rest on a sole plate 16 having an upturned toe 17 at each end. The entire shackle floats on a rubber mat having a bottom section 18 and raised flanges 20. The rubber is supported in a base casting 21 which rests on the chassis of a tractor, not shown, and has flanges 22 and lugs 23 which may have holes 24 for attachment bolts.

Although no means are shown to prevent the shackle rising out of the depression in the base casting 21, such means may be provided. As such means are shown in the patent granted the applicant on November 28, 1950, in Letters Patent 2,531,871 and form no part of the present invention they are not shown here.

As the chassis carries the bases 21 forward, the motion is transmitted through the flange 22 of the base and flange 20 of the rubber base 18 to the toe 17 of the shackle. The head 11 of the shackle which is carrying the vertical load of the forward end of the trailer carried by the plate 1 presses sidewise against the surface 5 of the fifth wheel lug and thus transmits the force to the fifth wheel which transmits the traction to the trailer.

As there are jolts, the shackle shown in Figure 3 will rock somewhat so that the head tilts somewhat, this calls for slight relative movement of the head of the shackle relative to the supporting lug which creates wear that is minimized by the large areas of the surface 5.

To keep the shackle and the fifth wheel plate in contact, the lower end of the downwardly extending long rib 4 has a flange 25 that extends inward and engages the outside surface of the cylinder between the side wall 13 and one end of the cylinder.

A clamping disc 30 has two flanges 31, 32 having different radii.

The flange 31 engages the outside surface of the cylinder 11 between the other side wall 13 of the shackle and the end of the cylinder.

The other flange 32 engages the outside surface of the flange 33 on the lug 2.

A bolt 34 extends through a hole in the clamping disc 30, the holes 15 in the two diaphragms 14 and a hole in long rib 4. This bolt may have a square shank that fits a square hole in long rib 4 to prevent the bolt turning. A nut 36 on bolt 34 holds the clamp disc, the head 11 of the shackle and the lug 2 in alignment. Grooves 37 on surface 5 and head 11 connect with a lubricating device 38. This lubricates the surface 5 of the lug and the head 11 of the shackle.

The surfaces which are in contact may be precision cast or machined as desired.

In the modified form of the invention shown in Figures 6 to 10 the head 11 of the shackle carries a raised ridge 40 which fits into a mating groove 41 in the cylindrical surface 5. In this manner any thrust in the direction of axis 6 is transmitted directly from the lug to the head 11 of the shackle without relying upon a long rib 4 which receives the side thrust directly in one direction and through a bolt 34 in the opposite direction as in Figure 4. This ridge 40 may be interrupted as shown at 49 in Figure 7 to allow lubricant to flow from one side of the ridge to the other.

The clamping discs 42, 43 are primarily intended to provide means whereby, through flanges 31, 32 engaging the outer surface of the head of the shackle and the flange 33 of the fifth wheel casting, the separation of the surface 5 and the head 11 of the shackle due to jolts is prevented.

The disc 43 may have a square hole 44 into which the square shank of a carriage bolt 34 fits. Rotation of the carriage bolt while the nut 36 is being drawn up is thereby prevented.

The connecting portion 45 between the two flanges 31 and 32 which have different radii bears against the end 46 of the surface 5, and thus prevents the disc turning relative to the surface 5 when the bolt is drawn up. These discs carry extensions 46 that are used to limit the rocking motion of the fifth wheel plate 1 about the axis 6.

As seen in Figures 7 and 8 the base casting 21 has one or more flanges 47 having an end 48 that engages extension 46 when the plate has tilted the permissible degree relative to the shackle.

The casting 21 may have covers 50. The upper end of each cover may extend into a slot 51 in the extension 48 on the base casting. In this manner a single fastening at 59 will hold a cover in place.

The bottom of the sole plate, instead of being flat as shown in Figure 3 may have a wavy or other irregular surface having receding areas 52 and raised areas 53. The rubber base 18 may have a corresponding contour on its upper surface and the lower surface may be bonded to the base casting 21.

Since the sole plate is pressed down vertically by the weight of the forward end of the semi-trailer but has a horizontal tractive component, much of the resulting load may be transmitted directly to the base from a large surface rather than entirely through the flanges 20 of the rubber if the surface on the underside of plate 16 is undulating.

The head of the bolt 34 may be concealed by a cover plate 55 which may be used to carry the vendor's or the maker's name.

I claim:

1. A fifth wheel having, in combination, two bases adapted to be supported on a tractor, a recess on the upper surface of each base, two shackles each of which has a foot supported in one of said recesses and two side walls rising from said foot and a hollow cylindrical head extending beyond said two side walls, a fifth wheel plate having laterally spaced lugs on its under side each having a concave cylindrical surface matching the convex surface of said shackle heads and transmitting the load and traction from the fifth wheel plate to the base, a vertical wall alongside of each lug extending down from the fifth wheel plate having a flange engaging one of the projecting ends of the cylindrical head, a flanged cap engaging the projecting other end of said cylindrical head and a flange on the lug, a bolt extending through the hollow head drawing the cap, the head and the flanged plate together to prevent the lug lifting from the shackle.

2. In a fifth wheel having a plate adapted to tilt and to transmit both the weight of a load resting on said fifth wheel and tractive stresses to a support by the direct bearing of the surfaces of the plate and the support, in combination, a support having a horizontal convex cylindrical surface, a fifth wheel plate having a downwardly extending lug adapted to engage approximately the upper half of said convex cylindrical surface, horizontally extending flanges at the ends of both said support and said engaging portion of the lug, means for holding said flanges in engagement to prevent vertical separation of the support and the fifth wheel plate while transmitting stresses and tilting as truck and trailer move over uneven roads.

3. In a fifth wheel having a plate adapted to tilt and to transmit both the weight of a load resting on said fifth wheel and tractive stresses to a support by the direct bearing of the surfaces of the plate and the support, in combination, a vertical support having at its upper end a horizontal tubular cylindrical portion extending beyond the support at each end, a fifth wheel plate having a downwardly extending lug adapted to engage approximately the upper half of the outer surface of said cylindrical portion, a vertical wall on said lug extending past one end of said cylindrical portion, a horizontally extending flange on said wall passing under the extended part of said cylindrical portion of the support, a clamping disc having flanges that engage respectively the outer surface of the other end of the cylindrical portion and a flange on the lug, a bolt passing through the clamping disc and the cylindrical portion and the wall to hold them in engagement to prevent vertical separation of support and fifth wheel plate while transmitting stresses and tilting as truck and trailer move over uneven roads.

4. A fifth wheel having, in combination, two bases adapted to be supported on a tractor, a recess on the upper surface of each base, two shackles each of which has a foot supported in one of said recesses and a hollow convex cylindrical head, a fifth wheel plate having laterally spaced lugs on its under side each having a concave cylindrical surface matching the convex surface of said shackle heads which transmit the load and also the traction from the fifth wheel plate to the bases, mating circumferential elements on the shackle head and the concave surface that prevent lateral relative movement of shackle head and lug.

5. A fifth wheel having, in combination, two bases adapted to be supported on a tractor, a recess on the upper surface of each base, a rubber mat in each recess, two shackles each of which has a foot supported on one of said mats and a convex cylindrical head, a fifth wheel plate having laterally spaced lugs on its under side each having a concave cylindrical surface matching the convex surface of said shackle heads which transmit the load and also the traction from the fifth wheel plate to the bases, two discs each having flanges adapted to engage the outside of a horizontally extending flange on the lug and the underside of the cylindrical head of the shackle, a bolt extending axially through the cylindrical head and drawing the two discs toward each other.

6. A fifth wheel having, in combination, two bases adapted to be supported on a tractor, a recess on the upper surface of each base, a rubber mat in each recess, two shackles each of which has a foot supported on one of said mats and a convex cylindrical head, a fifth wheel plate having laterally spaced lugs on its under side each having a concave cylindrical surface matching the convex surface of said shackle heads which transmit the load and also the traction from the fifth wheel plate to the bases, two discs each having a rim extending around approximately half its circumference adapted to engage the outside of a horizontally extending flange on the lug and a rim of smaller radius extending around approximately the other half of the circumference of the disc adapted to engage the underside of the end of the cylindrical head and bearing against the underside of the concave semi-cylindrical portion of the lug to prevent the disc rotating about its axis, a bolt extending axially through the cylindrical head drawing the two discs together, stops on the bases engaging stops carried by a disc when the fifth wheel has tilted a preset angle from the horizontal.

7. A fifth wheel shackle and base therefor having, in combination, a base having a horizontal area surrounded by a flange, a shackle having a foot with an undulating surface on its underside and vertical flanges at each end, a cupped rubber mat having an undulating upper surface located between the foot of the shackle and the horizontal area.

8. A fifth wheel shackle and base therefor having, in combination, a base having a horizontal area surrounded by a flange, a shackle having a foot with an undulating surface on its underside and vertical flanges at each end, a cupped rubber mat between the foot of the shackle and the horizontal area, a cylindrical head on said shackle located above said base, flanges on the sides of said base extending outward and approximately concentric with the axis of said shackle head when in its normal position, a stop at the end of each of said flanges, a cover plate adapted to close the upper side of said base extending above the foot into slots on the inner side of said stops, a single means at the outer end of said plate which both hold said plate against the upper edges of said base and prevents its sliding out of said slots.

9. Means for holding a fifth wheel plate and its shackles in contact, comprising, in combination, two bases adapted to be supported on a tractor, a recess on the upper surface of each base, two shackles the foot of each resting in one of said recesses, two parallel side walls of each of said shackles rising from the foot and supporting a horizontally extending cylindrical shackle head which extends beyond each of the side walls, a fifth wheel plate having laterally spaced lugs on its underside, each lug having a downwardly extending long rib adjacent to one end of said cylindrical head, a semi-cylindrical flange at the lower end of said long rib extending under one projecting end of the shackle head, a short rib extending downward from said fifth wheel plate, a concave semi-cylindrical portion of the fifth wheel plate extending from said long rib past said short rib and bearing upon the shackle head, a flanged clamping disc engaging the underside of the other projecting portion of said cylindrical shackle head and the upper side of said concave cylindrical portion of the fifth wheel plate, a bolt extending through holes in the cylindrical head and the long rib and the clamping disc to draw the clamping disc and the long rib toward the shackle head.

10. In a fifth wheel having a plate adapted to tilt on its support and to transmit thereto both the weight of a load resting on the fifth wheel plate and tractive stresses by the direct bearing of contacting surfaces on the plate and the support, in combination, a support having a horizontal tubular cylindrical portion with a convex outer surface, a fifth wheel plate having a downwardly extending lug adapted to engage approximately the upper half of said convex outer surface, a long rib on said lug which extends past one end of said cylindrical portion, a horizontaly extending flange at the adljacent end of the cylindrical portion of the support, a horizontal flange on said long rib extending under said flange of the support, a bolt extending through said hollow tubular cylindrical portion of the support and said long rib, a disc having a central hole at the other end of said cylindrical portion which anchors said bolt to hold the long rib and support in contact.

11. A fifth wheel transmitting load from the plate to its support through abutting surfaces which permit tilting, having in combination, a fifth wheel plate having laterally spaced lugs with concave cylindrical surfaces on its under side, supporting shackles having convex cylindrical surfaces abutting said concave surfaces on the fifth wheel plate, a clamping disc whose curved flanges engage an associated shackle head and the lug in a manner to resist the movement of the fifth wheel plate out of contact with the shackle by the direct bearing of lug and shackle against portions of the clamping disc permitting the cylindrical surfaces to pivot relative to each other and to prevent one surface to be lifted from the other, and a bolt passing through the shackle and the clamping disc to hold them in contact.

12. A fifth wheel having, in combination, two bases adapted to be supported on a tractor, a recess on the upper surface of each base, two shackles each of which has a foot supported in one of said recesses and a convex cylindrical head, a fifth wheel plate having laterally spaced lugs on its under side, each having a concave cylindrical surface matching the convex surface of said shackle heads which transmit the load and also the traction from the fifth wheel plate to the bases, a flange on each of said lugs concentric with said concave surface, a clamping disc having flanges that extend under the cylindrical head and above said flange on the lug which prevent the lugs from being lifted off said cylindrical heads by jolts due to highway irregularities and a bolt passing through the cylindrical head and the clamping disc to hold them in contact.

13. A fifth wheel having, in combination, two bases adapted to be supported on a tractor, a recess on the upper surface of each base, a rubber mat in each recess, two shackles each of which has a foot supported on one of said mats and a convex cylindrical head, a fifth wheel plate having laterally spaced lugs on its under side each having a concave cylindrical surface matching the convex surface of said shackle heads which transmit the load and also the traction from the fifth wheel plate to the bases, a flange on said lug concentric with said concave surface, a clamping disc having flanges that extend under the cylindrical head and above said flange on the lug which prevents the lug from being lifted off said cylindrical heads by jolts due to highway irregularities and a bolt passing through the cylindrical head and the clamping disc to hold them in contact.

14. A fifth wheel having, in combination, two bases adapted to be supported on a tractor, a recess on the upper surface of each base, two shackles each of which has a foot supported in one of said recesses and a hollow convex cylindrical head, a fifth wheel plate having laterally spaced lugs on its under side each having a concave cylindrical surface matching the convex surface of said shackle heads which transmit the load and also the traction from the fifth wheel plate to the bases, a flange on said lug concentric with said concave surface, a disc having flanges that extend under the cylindrical head and above said flange on the lug which prevents the lug from being lifted off the cylindrical heads by jolts due to highway irregularities, a bolt extending axially through said head and said disc holding the disc in contact with said lug and cylindrical head, and means at the other end of said head to anchor said bolt.

15. A fifth wheel having, in combination, two bases adapted to be supported on a tractor, a recess on the upper surface of each base, two shackles each of which has a foot supported in one of said recesses and a convex cylindrical head, a fifth wheel plate having laterally spaced lugs on its under side each having a concave cylindrical surface matching the convex surface of said shackle heads which transmit the load and also the traction from the fifth wheel plate to the bases, mating circumferential elements on the shackle head and the concave surface that prevent lateral relative movement of shackle head and lug, a flange on said lug concentric with said concave surface, a clamping disc having flanges that extend under the cylindrical head and above said flange on the lug which prevents the lug from being lifted off said cylindrical heads by jolts due to highway irregularities and a bolt passing through the cylindrical head and the clamping disc to hold them in contact.

16. A fifth wheel having, in combination, two bases adapted to be supported on a tractor, a recess on the upper surface of each base, a rubber mat in each recess, two shackles each of which has a foot supported on one of said mats and a convex cylindrical head, a fifth wheel plate having laterally spaced lugs on its under side each having a concave cylindrical surface matching the convex surface of said shackle heads which transmit the load and also the traction from the fifth wheel plate to the bases, mating circumferential elements on the shackle head and the concave surface that prevent lateral relative movement of shackle head and lug, a flange on said lug concentric with said concave surface, a clamping disc having flanges that extend under the cylindrical head and above said flange on the lug which prevents the lug from being lifted off said cylindrical heads by jolts due to highway irregularities and a bolt passing through the cylindrical head and the clamping disc to hold them in contact.

17. A fifth wheel having, in combination, two bases adapted to be supported on a tractor, a recess on the upper surface of each base, a rubber mat in each recess, two shackles each of which has a foot with an undulating underside surface supported on one of said mats and a convex cylindrical head, a fifth wheel plate having laterally spaced lugs on its under side each having a concave cylindrical surface matching the convex surface of said shackle heads which transmit the load and also the traction from the fifth wheel plate to the bases, a flange on said lug concentric with said concave surface, a clamping disc having flanges that extend under the cylindrical head and above said flange on the lug which prevents the lug from being lifted off said cylindrical heads by jolts due to highway irregularities and a bolt passing through the cylindrical head and the clamping disc to hold them in contact.

References Cited in the file of this patent
UNITED STATES PATENTS

| | | |
|---|---|---|
| 1,968,573 | Seyferth | July 31, 1934 |
| 2,084,291 | Ranger | June 15, 1937 |
| 2,287,874 | Gibbons et al. | June 30, 1942 |
| 2,531,871 | Braunberger | Nov. 28, 1950 |